(12) United States Patent
Huo et al.

(10) Patent No.: US 11,536,686 B2
(45) Date of Patent: Dec. 27, 2022

(54) METHOD OF MANUFACTURING ION-SELECTIVE MEMBRANES

(71) Applicant: Endress+Hauser Conducta, Inc., Anaheim, CA (US)

(72) Inventors: Jinshan Huo, Corona, CA (US); Dennis Hui, Hacienda Heights, CA (US); Alden David, Aliso Viejo, CA (US)

(73) Assignee: Endress+Hauser Conducta Inc., Anaheim, CA (US)

( * ) Notice: Subject to any disclaimer, the term of this patent is extended or adjusted under 35 U.S.C. 154(b) by 227 days.

(21) Appl. No.: 16/876,550

(22) Filed: May 18, 2020

(65) Prior Publication Data

US 2021/0356421 A1   Nov. 18, 2021

(51) Int. Cl.
    *G01N 27/333*         (2006.01)
(52) U.S. Cl.
    CPC .................. *G01N 27/3335* (2013.01)
(58) Field of Classification Search
    None
    See application file for complete search history.

(56) References Cited

PUBLICATIONS

A. Craggs, et al. ("PVC Matrix Membrane Ion-Selective Electrodes", Journal of Chemical Education, 51(8): p. 541-544, August (Year: 1974).*

* cited by examiner

*Primary Examiner* — J. Christopher Ball
(74) *Attorney, Agent, or Firm* — Christopher R. Powers; Endress+Hauser (USA) Holding, Inc.

(57) ABSTRACT

A method of manufacturing membranes consisting essentially of an ion-selective material is disclosed. The method comprises: providing a spreadable base material; dispensing a quantity of the base material onto a top side of a tray, wherein the top side includes a set of coplanar flat surface segments, each having a surface area corresponding to a disc area of one of the membranes to be manufactured, and wherein at least the top side of the tray consists essentially of a non-adhesive material; distributing the dispensed base material across the top side of the tray such that a thickness of the distributed base material covering the coplanar surface segments corresponds to a predetermined thickness; transforming the thus-distributed base material into ion-selective material comprising one or more coplanar sheets covering the coplanar surface segments; and removing individual membranes from the tray, each defining a disc-shaped section of the ion-selective material.

16 Claims, 5 Drawing Sheets

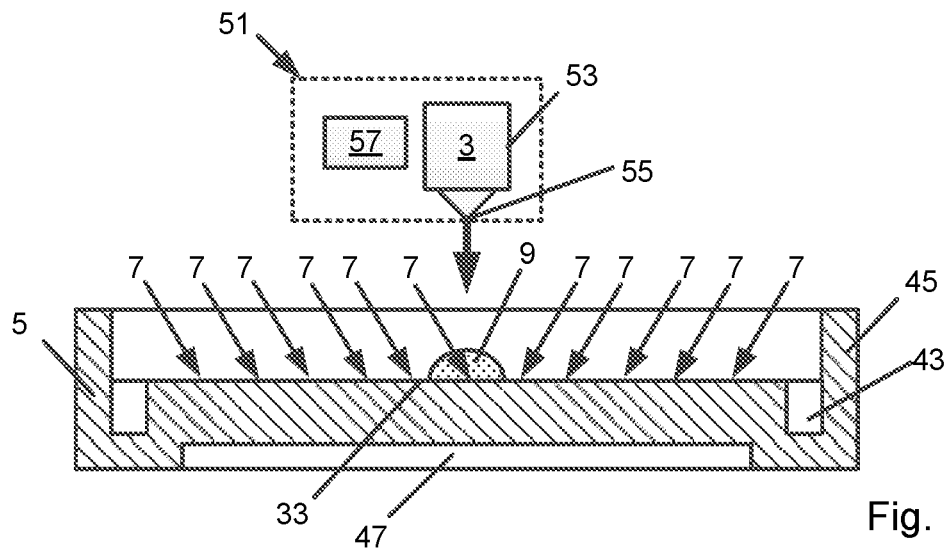
Fig. 1a
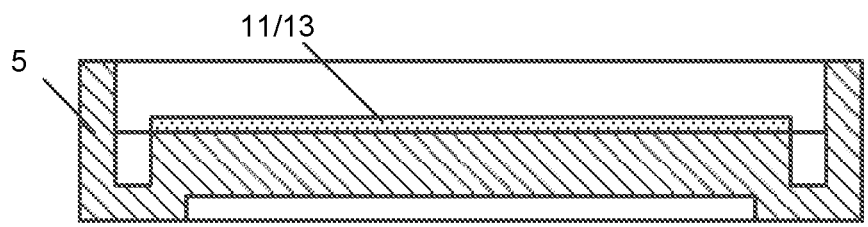
Fig. 1b
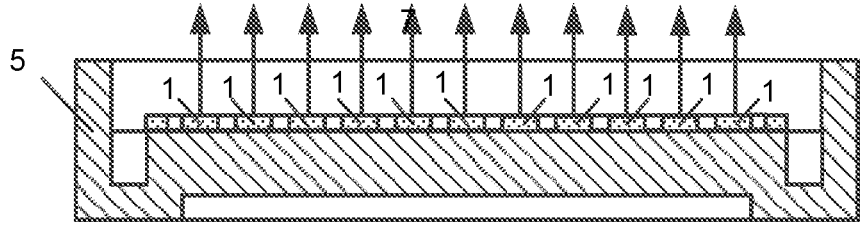
Fig. 1c
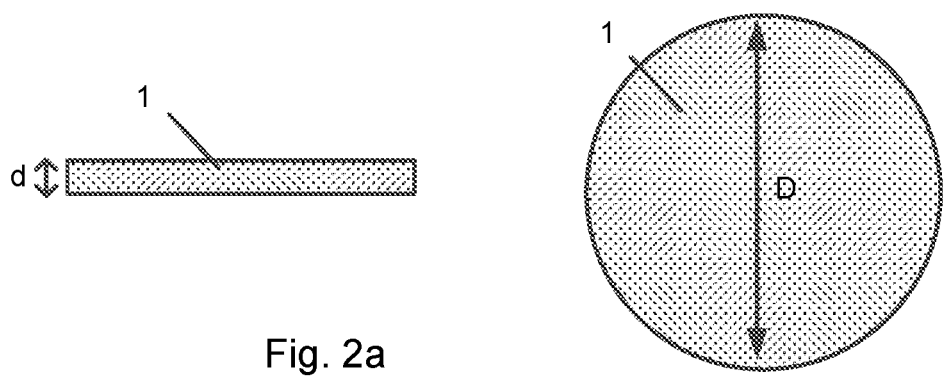
Fig. 2a
Fig. 2b

METHOD OF MANUFACTURING ION-SELECTIVE MEMBRANES

TECHNICAL FIELD

The present disclosure relates to a method of manufacturing membranes of a predetermined thickness consisting of an ion-selective material, a membrane manufactured by this method and a sensor comprising a membrane manufactured by this method.

BACKGROUND

Membranes consisting of ion-selective material, like e.g., ion-selective glass, are commonly used in various types of sensors. Examples are electrochemical sensors, like e.g., potentiometric sensors, applied in laboratories as well as in industrial applications to measure a variable of a medium, like e.g., an activity or a concentration of an analyte included in the medium or a pH-value of the medium.

Potentiometric sensors generally comprise a measuring half-cell and a reference half-cell. The measuring half-cell comprises an electrolyte, an electrode extending into the electrolyte and an ion-selective membrane, having an inside surface exposed to the electrolyte located inside the measuring half-cell and an outer surface exposed to the medium. Due to the ion-selective interaction of the membrane with the medium, an electric measurement potential corresponding to the variable to be measured can be derived via the electrode. Quantitative determination of the variable is, e.g., performed based on the measurement potential, e.g., by determining a difference between the measurement potential and a reference potential, like e.g., a reference potential provided by a reference-half cell.

For changes of the magnitude of the measured variable to have a measurable effect on the measurement potential or the difference between the measurement potential and the reference potential, an electrical impedance of the membrane should not exceed a predetermined limit, e.g., a limit given by a resolution and/or a measurement accuracy of a measurement device, e.g., measurement electronics, determining the measurable effect. Due to the low electrical conductivity of ion-selective materials available on the market, this impedance limit requires that the membranes to be relatively thin. A thickness of the membranes smaller or equal to a few tenths of a millimeter is usually required to limit the electrical impedance to an acceptable magnitude, e.g., a magnitude of less than 5 GΩ.

Ion-selective membranes constitute a key component of these sensors and their properties, and dimensions are relevant factors with respect to the quality, the measurement accuracy and the performance of these sensors.

Manufacturing sufficiently thin membranes with high precision is a very demanding task. Traditionally, glass blowing methods have been applied for this purpose. Examples are methods, as, e.g., described in US 2016/0176745 A1, wherein an open end of a hollow glass tube is dipped into a melt of ion-selective glass and then withdrawn again, thereby extracting a certain amount of glass melt. The thus-extracted melt covering the open end of the tube is then blown into shape by air pressure supplied through an opposite open end of the tube. Once the desired shape and wall thickness is achieved, the tube and the extracted melt are cooled.

Due to the different coefficients of thermal expansion of the glass tube and the ion-sensitive glass of the membrane, there is a risk that the cooling process may cause cracks in the ion-selective glass and/or may induce thermomechanical tensions reducing the mechanical stability of the membrane.

Thus, manual performance of these glass-blowing methods requires highly skilled personnel and is time and cost-intensive. Even though some progress in automating glass-blowing has been achieved, time and cost-effective high precision manufacturing of larger numbers of ion-selective glass membranes remains a highly demanding task.

U.S. Pat. No. 4,883,563 A discloses a different approach, wherein thin disc-shaped ion-selective glass membranes are manufactured by mechanically cutting a glass block into glass sheets having a thickness as near as possible to the thickness of the membranes to be manufactured. These glass sheets are then subjected to an etching process, reducing the thickness and the unevenness of the glass sheets, followed by a high-speed surface heat treatment with previous heating.

Mechanical cutting of a glass block into sufficiently thin sheets is highly demanding. Thus, it is not only time and cost-intensive, but will also produce a fair number of rejects, e.g., due to sheets cracking or breaking under the mechanical force exerted onto them.

As an alternative, thick film printing methods or thin film coating methods can be applied to produce an ion-selective glass layer on a substrate. These methods are however not suitable to produce individual membranes to be used without the substrate on which they were produced.

Accordingly, there remains a need for further contributions in this area of technology.

As an example, there is a need for a method of manufacturing individual membranes having a thickness of a few tenths of a millimeter or less that enables a time and cost-effective, high precision production of ion-selective membranes and/or to minimize mechanical and/or thermomechanical stresses that may cause cracks and/or induce tensions into the membranes.

SUMMARY

The present disclosure discloses a method of manufacturing membranes of a predetermined thickness consisting essentially of an ion-selective material, the method comprising the steps of:

providing a spreadable base material, wherein the base material comprises all constituents of the ion-selective material and can be transformed into the ion-selective material;

dispensing a quantity of the base material onto a top side of a tray; wherein the top side comprises a set of coplanar flat surface segments, each having a surface area corresponding to a disc area of one of the membranes to be manufactured on the tray, and wherein the tray or at least the top side of the tray consists of a material enabling the base material to be distributed across the top side of the tray and for ion-selective material attainable by transforming the base material into ion-selective material on the tray to be lifted off the tray;

distributing the dispensed base material across the top side of the tray such that a thickness of the distributed base material covering the coplanar surface segments corresponds to the predetermined thickness;

transforming the thus-distributed base material into ion-selective material comprising one or more coplanar sheets covering the coplanar surface segments; and removing individual membranes, each defining a disc-shaped section of the ion-selective material attained by the transformation from the tray.

This method has the advantage that the spreadability of the base material enables a very uniform thickness of a very accurately producible size of the distributed base material to be easily achieved. In consequence, a very uniform thickness of very accurately producible size of the sheet(s) and thus also of the individual membranes is achieved.

Further, the flat shape and the small thickness of the distributed base material, as well as the non-adhesive material of the tray, provide the advantage that each sheet produced by transforming the distributed base material into ion-selective material is essentially free of cracks and essentially free of mechanical and thermomechanical tensions that potentially could be caused by the transformation.

Additional advantages of the method are that it can easily be performed in a semi- or fully automated manner and that each performance provides a plurality of membranes.

In an embodiment, the base material is provided in the form of a melt, the dispensed base material is distributed or distributed by melt spinning or distributed by scraping the base material across the top side, the distributed base material comprises one or more coplanar films, and the film(s) are transformed into the sheet(s) by cooling to a temperature below a melting point of the ion-selective material.

In such an embodiment, melt spinning is performed by: mounting the tray onto a rotating table and causing the tray to rotate; dispensing the quantity of the melt onto a center section of the rotating tray; and controlling a thickness of each sheet resulting from transforming the distributed base material by controlling one or more parameters of a group of parameters comprising: a temperature of the melt, a speed of rotation or a time sequence of speeds of rotation of the rotating table, a cooling rate, at which the melt cool(s) and an air flow circulating through at least one channel extending in parallel to the film(s) through the rotating table.

In another embodiment, the base material is provided in form of a powder or a powder consisting of particles having a diameter or particle size smaller or equal to 5 µm; the dispensed base material is distributed or is distributed by scraping the base material across the top side; the distributed base material comprises one or more coplanar powder layer(s); and the powder layer(s) are transformed into the sheet(s) by: a) melting the powder layer(s) by heating the powder layer(s) to a temperature above a melting point of the ion-selective material or to a temperature of 50° C. to 1000° C. above a melting point of the ion-selective material and subsequently cooling the melt produced by melting the powder layer(s) to a temperature below the melting point; or b) pressing the powder layer(s) and heating the powder layer(s) to a temperature above a melting point of the ion-selective material or to a temperature of 50° C. to 1000° C. above a melting point of the ion-selective material and subsequently cooling the melt produced by melting the powder layer(s) to a temperature below the melting point, wherein pressing the powder layer(s) is performed by applying a compression pressure of 0 bar to 5000 bar to the powder layer(s) before the powder layer(s) are heated, before and during heating of the powder layer(s), or during heating of the powder layer(s).

In an embodiment, each coplanar surface segment is defined by a segment of a single flat surface comprising the coplanar surface segments; and the base material is distributed across the single flat surface and transformed into a single sheet of ion-selective material.

In another embodiment, the tray comprises a flat surface surrounding at least one recess, wherein: each recess has a flat bottom surface area constituting one of the coplanar surface segments or comprising at least one, several or all of the coplanar surface segments; each recess has a depth corresponding the predetermined thickness or a depth given by a sum of the predetermined thickness and an offset corresponding to a thickness change caused by transforming the distributed base material into the ion-selective material; and by distributing the base material across the tray, each recess is filled with the base material, and the distributed base material filling the recess(es) is transformed into individual disc-shaped sheets of ion-selective material.

In an embodiment, removing the membranes off the tray comprises the steps of: separating individual membranes comprised in the one or more coplanar sheets from a remainder of the sheet(s) or separating each membrane comprised in the one or more coplanar sheet(s) from a remainder of the sheet(s) by selective etching, by electrochemical discharge machining (ECDM), by laser cutting, by waterjet cutting or by electrochemically cutting out the membranes; and lifting the membranes off the tray.

In an embodiment, removing the membranes from the tray comprises the step of electrochemically cutting out individual membranes comprised in the one or more coplanar sheets by: covering a top surface of the sheet(s) with an electrolyte capable of electrochemically etching the ion-selective material; placing an electrode above the sheet(s) such that the electrode extends into the electrolyte, wherein the electrode comprises a structure or a structure defined by a honeycomb structure, the structure protruding from a front side of the electrode facing the tray, the structure comprising a number of coplanar end surfaces corresponding to the number of membranes to be cut out, each end surface surrounding an end section of a recess surrounded by the structure having a cross-sectional area corresponding to a disc area of the membrane to be cut out by the end surface, positioning the coplanar end surfaces in parallel to the sheet(s) at a predetermined distance or a distance of 1 µm to 10 mm or a distance of 1 µm to 3 mm to the sheet(s); and cutting out the membranes by applying a DC voltage or a DC voltage $V_{DC}$ of 0.1 V to 10 V between each sheet serving as anode and the electrode serving as cathode.

In such an embodiment, the method comprises one or more of the steps of: a) covering the top surface of the sheet(s) with a solution of hydrogen fluoride, with hydrofluoric acid, with a solution of hydrogen fluoride having a concentration of 0.1% to 5% of hydrogen fluoride, with potassium hydroxide, with an alkaline solution or with another electrolyte capable of electrochemically etching the ion-selective material; b) heating the electrolyte to a temperature of 25° C. to 95° C.; c) positioning the electrode such that the coplanar end surfaces of the electrode are located at a distance of 1 µm to 10 mm or a distance of 0.001 mm to 3 mm from the top surface of the sheet(s) facing towards the electrode during cutting; and d) recirculating the electrolyte covering the sheet(s) during electrochemical cutting.

In another embodiment, the method comprises one or more of the steps of: performing the distribution of the base material such that the thickness of the distributed base material deviates from the predetermined thickness of the membranes to be manufactured by an offset accounting for a thickness change caused by transforming the distributed base material into the ion-selective material; performing at least one of the method steps in a semi- or fully automated manner, by having an apparatus designed to perform the respective step perform the respective step; and performing a step of planarizing a surface of each of the one or more coplanar sheet(s) or of planarizing a surface of each of the one or more coplanar sheet(s) by polishing, by etching or by electrochemical planarization.

In an embodiment, the method comprises a method step of planarizing a surface of each of the one or more coplanar sheet(s) by: covering a top surface of the sheet(s) with an electrolyte or an electrolyte given by: a solution of hydrogen fluoride, a hydrofluoric acid, a solution of hydrogen fluoride having a concentration of 0.1% to 5% of hydrogen fluoride, potassium hydroxide or by an alkaline solution, wherein the electrolyte is capable of electrochemically etching the ion-selective material; positioning an electrode at a predetermined distance, a distance of 1 µm to 10 mm or a distance of 0.001 mm to 3 mm above the top surfaces of the sheet(s) such that the electrode extends into the electrolyte; and planarizing the surface(s) by applying a DC-voltage or a DC-voltage of 0.1 V to 10 V between the sheet(s) serving as anode and the electrode serving as cathode.

In such an embodiment, the electrode is either: an electrode comprising a flat surface, wherein the flat surface is facing towards the sheet(s) and extends in parallel to the sheet(s), and wherein the electrode is either stationary or rotating around its longitudinal axis perpendicular to its flat surface during planarization; or a rotatable electrode rotating during planarization; or an electrode comprising a rotatable bar, a rotatable plate, or a rotatable mesh rotating during planarization; or a rotatable electrode rotating around its longitudinal axis during planarization and comprising a structure or a structure defining a honeycomb structure, the structure protruding from a front side of the electrode facing the tray.

In an embodiment, the tray comprises at least one of: an annular groove surrounding a flat surface of the tray; an outside side wall surrounding the flat surface and extending above the flat surface of the tray; and a recess located on its back side facing away from the topside enabling the tray to be mounted onto a support of the same size or other mounting means embodied to mount the tray onto the support.

In an embodiment, the ion-selective material is: an ion-selective glass, a pH-glass, a pH-glasses suitable for high temperature applications, a pH-glass chemically resistant to solutions of hydrogen fluoride, an ion-selective crystalline solid, $F^+$ ion-selective lanthanum trifluoride ($LaF_3$), an ion-selective polymer or a sulfonated tetrafluoroethylene based fluoropolymer-copolymer.

The present disclosure further discloses a membrane manufactured by the method disclosed, having at least one of: a thickness of 0.05 mm to 3 mm or of 0.05 mm to 1 mm; a thickness of less than a few tenth of a millimeter, of less than 0.2 mm or of less than 0.1 mm; a uniformity of the thickness, wherein thickness variations are smaller or equal to 5% or smaller or equal to 3% of the thickness of the membrane throughout an entire disc area of the membrane; and a disc area of 1 $mm^2$ to 100 $mm^2$.

The present disclosure further discloses a sensor for measuring a variable comprising a membrane manufactured by the method disclosed, wherein the variable is an activity or a concentration of an analyte comprised in a medium or a pH-value of the medium, the sensor comprising: a housing; an electrolyte located inside the housing, and an electrode extending into the electrolyte; wherein the membrane is mounted onto the housing; and wherein an outer surface of the membrane is exposable to the medium and an inner surface of the membrane is in contact with the electrolyte.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIGS. 1a-1c show steps of a method of manufacturing a set of membranes;

FIG. 2a shows a cross-sectional view of a membrane;

FIG. 2b shows a plan view of the membrane shown in FIG. 2a;

FIG. 3 shows a sensor comprising the membrane shown in FIG. 2a;

DETAILED DESCRIPTION

Figure 3:
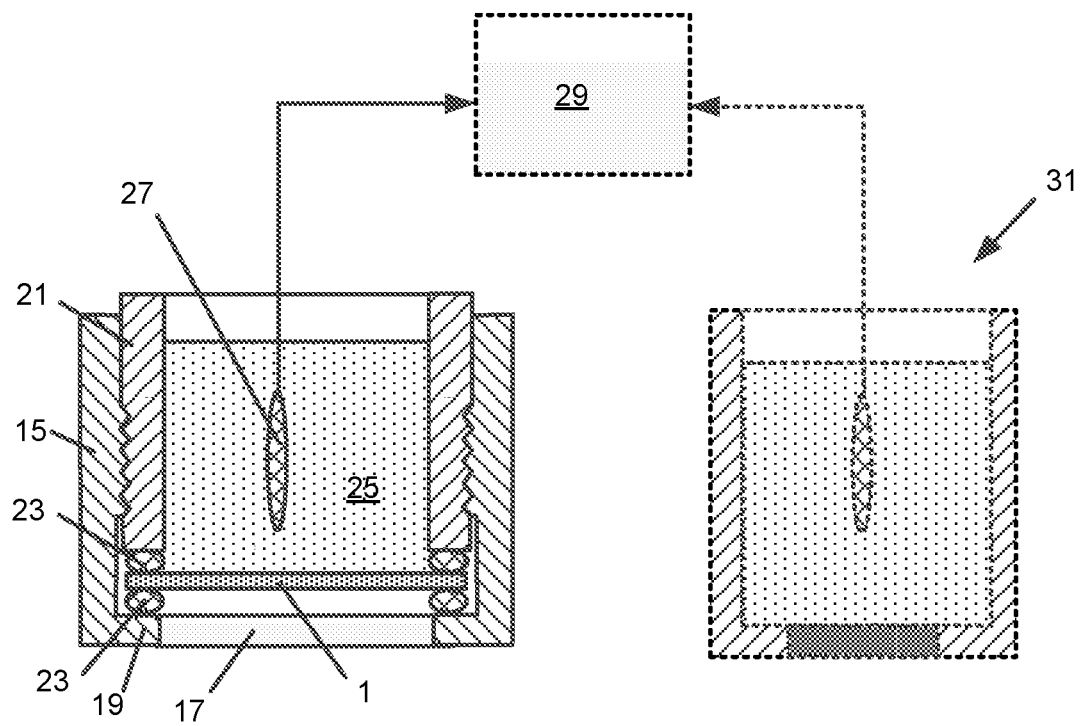

The present disclosure includes a method of manufacturing sets of disc-shaped membranes 1 having a predetermined thickness and consisting essentially of an ion-selective material. Individual method steps a) to c) are illustrated in FIGS. 1a-1c. The ion-selective material can, e.g., be an ion-selective glass, an ion-selective polymer or another crystalline or non-crystalline solid. To this extent, one of the various types of ion-selective materials known in the art and/or applied as ion-selective material of membranes used in electrochemical and/or potentiometric sensors known in the art can be applied. Examples are ion-selective glasses, like e.g., hydrogen ion ($H^+$) ion-selective glasses. $H^+$ ion-selective glasses are commonly referred to as pH glasses and comprise a range of glasses suitable for various applications. Examples are pH-glasses suitable for high temperature applications, as well as pH-glasses chemically resistant to solutions of hydrogen fluoride. As another example, ion-selective crystalline solids, like e.g., fluoride ($F^+$) ion-selective lanthanum trifluoride ($LaF_3$) or ion-selective polymers, like e.g., sulfonated tetrafluoroethylene based fluoropolymer-copolymers, can be used.

The method comprises a preparatory step of providing a spreadable base material 3. This base material 3 comprises all constituents of the ion-selective material and can be transformed into the ion-selective material. As an example, the base material 3 is, e.g., provided in form of a melt of the ion-selective material transformable into the ion-selective material by cooling it to a temperature below a melting point of the ion-selective material. As another example, the base material 3 is, e.g., provided in form of a powder that can be transformed into the ion-selective material, e.g., by melting the powder and subsequently cooling the melt produced by melting the powder to a temperature below the melting point of the ion-selective material.

In step a) a quantity of the base material 3 is dispensed onto a top side of a tray 5 comprising a set of coplanar flat surface segments 7, each surface segment 7 having a surface area corresponding to a disc area of one of the membranes 1 to be manufactured on the tray 5. In addition, the entire tray 5 or at least its top side consists essentially of a material, like e.g., tungsten or a ceramic material, to enable the dispensed base material 9 to be distributed across the top side of the tray 5 and for the ion-selective material attainable by transforming base material 3 into ion-selective material on the tray 5 to be lifted off the tray 5. In other words, the tray 5 is configured as a non-stick or non-adhesive tray 5 with respect to the base material 3, the base material 3 transforming into ion-selective material on the tray 5, and the ion-selective material attained by this transformation.

In step b) the dispensed base material 9 is distributed across the top side of the tray 5 such that a thickness of the distributed base material 11 covering each of the coplanar surface segments 7 corresponds to the predetermined thickness of the membranes 1 to be manufactured. The thus-distributed base material 11 is transformed into ion-selective material comprising one or more coplanar sheets 13 covering the coplanar surface segments 7, e.g., by a cooling process causing the melt to solidify or by melting the powder and subsequently cooling the melt produced by melting the powder.

In method step c) individual membranes 1, each defined by a disc-shaped section of the ion-selective material attained by the transformation are removed from the tray 5. Depending on the shape of the sheet(s) 13 manufactured in step b), step c) is either performed by individualizing and subsequently lifting off separate membranes 1 comprised in the one or more sheet(s) 13 or by lifting off all membranes 1 given by one of the sheets.

FIG. 2a shows a cross-sectional view and FIG. 2b a plan view of an example of one of the membranes 1 produced by this method. As described in more detail below, membranes 1 having a thickness d of 0.05 mm to 1 mm or larger, in particular membranes 1 having a thickness of less than a few tenths of a millimeter, a thickness smaller or equal to 0.2 mm, or even smaller or equal to 0.1 mm can be manufactured by this method with very high accuracy. As an example, membranes 1 having a disc area of 1 mm$^2$ to 100 mm$^2$ can be manufactured. The membrane 1 shown in FIG. 2b has a circular disc area, e.g., a circular disc area having a diameter D of 1 mm to 10 mm. As an alternative, membranes having a disc area of a different shape, e.g., membranes having a square or rectangular disc area or membranes having a disc area of irregular shape can be manufactured, e.g., a shape compliant to requirements of an application where the membranes 1 are to be used.

Membranes 1 manufactured by the method described above can be applied in various applications. FIG. 3 shows an example of a sensor comprising one of the membranes 1 manufactured as described above. This exemplary sensor comprises a housing 15, e.g., a tubular housing, having an opening 17 closed off by the membrane 1 mounted onto the housing 15. In the embodiment shown, an outer rim of the membrane 1 is clamped between an inwardly extending shoulder 19 of the housing 15 and a counterpart 21 mounted inside the housing 15. An interior of the housing 15 is sealed off by a first seal 23, e.g., an O-ring, clamped between the outer rim of the membrane 1 and the shoulder 19 and a second seal 23, e.g., an O-ring, clamped between the outer rim of the membrane 1 and the counterpart 21. As an example, the counterpart 21 is, e.g., a tubular counterpart that is screwed into the tubular housing 15. Alternatively, other means of mounting disc-shaped membranes 1 can be applied instead.

As an example, the housing 15 closed off by the membrane 1 is, e.g., embodied as a sensing element of the sensor, e.g., as a measurement cell or a measurement half-cell of an electrochemical and/or potentiometric sensor measuring a variable of a medium, like e.g., an activity or a concentration of an analyte comprised in the medium, e.g., a pH-value of the medium. In such an embodiment, an outer surface of the membrane 1 is exposable to the medium and an inner surface of the membrane 1 is in contact with an electrolyte 25, like e.g., a pH buffer solution, enclosed in an interior of the housing 15. Due to the ion-selective interaction of the membrane 1 with the medium, an electric measurement potential corresponding to the variable to be measured can be derived via an electrode 27 extending into the electrolyte 25. As an option, the electrode 27 is, e.g., connected to a measurement device 29, e.g., measurement electronics, embodied to quantitatively determine the variable based on the measurement potential provided by the electrode 27 or based on a difference between the measurement potential and a reference potential, e.g., a reference potential provided by a reference-half cell 31, provided to the measurement device 29.

In such applications, the time and cost-efficient manufacturing of the membrane 1 not only reduces the manufacturing costs of these sensors, but also improves their quality, in particular due to the consistent membrane thickness achieved by the method. In addition, the achievable sensor performance, like e.g., a sensor response time to changes of the variable measured and/or a measurement accuracy, is improved, in particular due to the achievable relatively thin thickness, as well as the high precision and the uniformity of the thickness of the membranes 1 manufactured as described above.

With respect to the manufacturing method, various embodiments of the method steps a) to c), as well as of the tray 5 and/or other means, apparatus or machinery applied to perform the method steps a) to c) can be applied without deviating from the scope of the invention. Several embodiments are described in more detail below.

Figure 4:
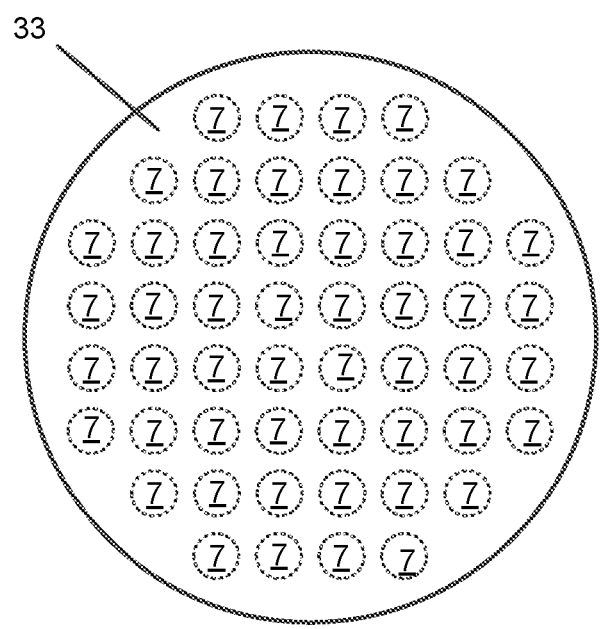
FIG. 4 shows a flat surface of the tray shown in FIG. 1.

In the embodiment shown in FIGS. 1a-1c, the tray 5 comprises a flat surface 33 and the flat surface 33 comprises the coplanar surface segments 7. Thus, each coplanar surface segment 7 is defined by a surface segment of the single, flat surface 33. FIG. 4 shows a plan view of the flat surface 33, wherein the coplanar surface segments 7 are indicated by dotted lines. In this embodiment, the base material 3 is evenly distributed across the flat surface 33 and thus transformed into a single sheet 13 as shown in method step b).

Figure 5A:
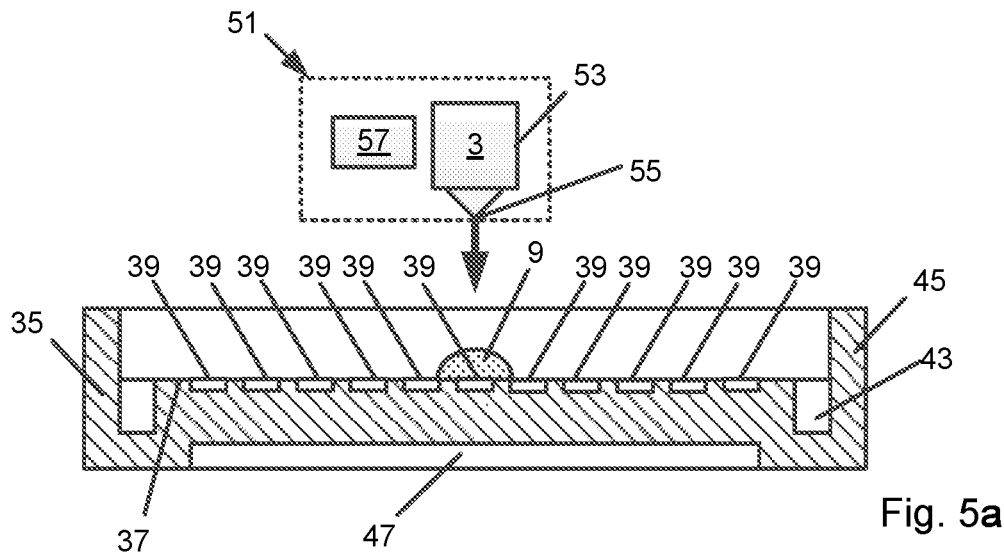
FIGS. 5a-5c show the method steps shown in FIG. 1 as performed on a tray comprising recesses.
Figure 5B:
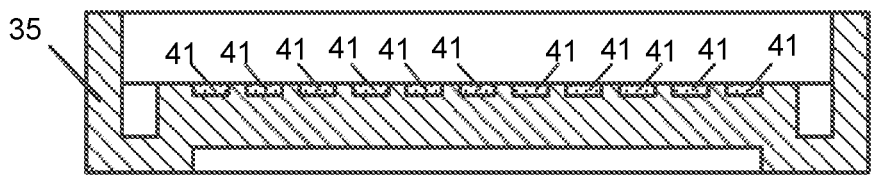
Figure 5C:
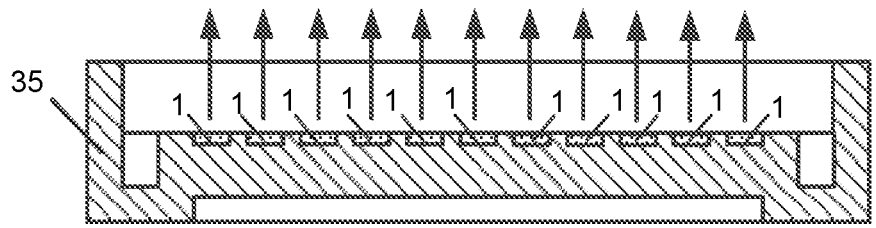
Figure 6:
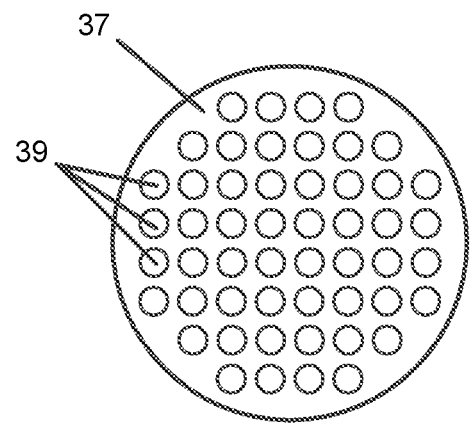
FIG. 6 shows a flat surface of the tray shown in FIG. 5.

FIGS. 5a-5c show an alternative embodiment, wherein the method steps a) to c) shown in FIGS. 1a-1c are perform on a different tray 35. This tray 35 comprises a flat surface 37 interrupted by a number of recesses 39 in the top side of the tray 35. A plan view of the flat surface 37 is shown in FIG. 6. Each recess 39 has a flat bottom surface area corresponding to the disc area of the membrane 1 to be manufactured therein and a depth corresponding to the predetermined thickness d of the membranes 1. In this embodiment, each coplanar surface segment 7 is defined by the flat bottom surface of one of the recesses 39. Thus, by distributing the base material 3 across the tray 35, each recess 39 is filled with the base material 3 and the distributed base material filling the recesses 39 is transformed into individual disc-shaped sheets 41 of ion-selective material.

Regardless of the type of tray 5, 35 employed, other optional features may be included on the tray 5, 35. Examples are shown in FIGS. 1a-1c and 5a-5c. As an option, the tray 5, 35, e.g., comprises an annular groove 43 surrounding the flat surface 33, 37 of the tray 5, 35. This has the advantage, that surplus base material 3 can and will be collected in the groove 43, if necessary. As an additional or alternative option, the tray 5, 35, e.g., comprises a side wall 45 surrounding the flat surface 33, 37 and extending above the flat surface 33, 37. The side wall 45 has the advantage that it facilitates the performance of optional method steps, like e.g., cutting methods or planarization methods described in more detail below, requiring for a top surface of the sheet(s) 13, 41 manufactured on the tray 5, 35 to be covered by a liquid, like e.g., an electrolyte. As an additional or alternative option, the tray 5, 35, e.g., comprises a recess 47 located on its back side facing away from the topside enabling the tray 5, 35 to be mounted onto a support 49 (as shown in FIGS. 8, 9, 10 and 12), like e.g., a rotating table or a support plate, of the same size. As an alternative, other mounting means, like e.g., fasteners such as screw bolts, embodied to mount the tray 5, 35 onto the support 49 are possible.

The step a) of dispensing the quantity of the base material 3 is either performed manually or in a semi- or fully automated manner, e.g., by a dispenser 51 adapted to dispense the base material 3. FIGS. 1a and 5a show an example of a dispenser 51 comprising a reservoir 53 containing the base material 3, an outlet 55 connected to the reservoir 53 and a controller 57, like e.g., a computer, a microcontroller or another suitable device, connected to the reservoir 53 and/or the outlet 55 and embodied to control the quantity of the base material 3 being dispensed through the outlet 55.

Various ways of distributing the dispensed base material 9 on the tray 5, 35 can be employed.

Figure 7:
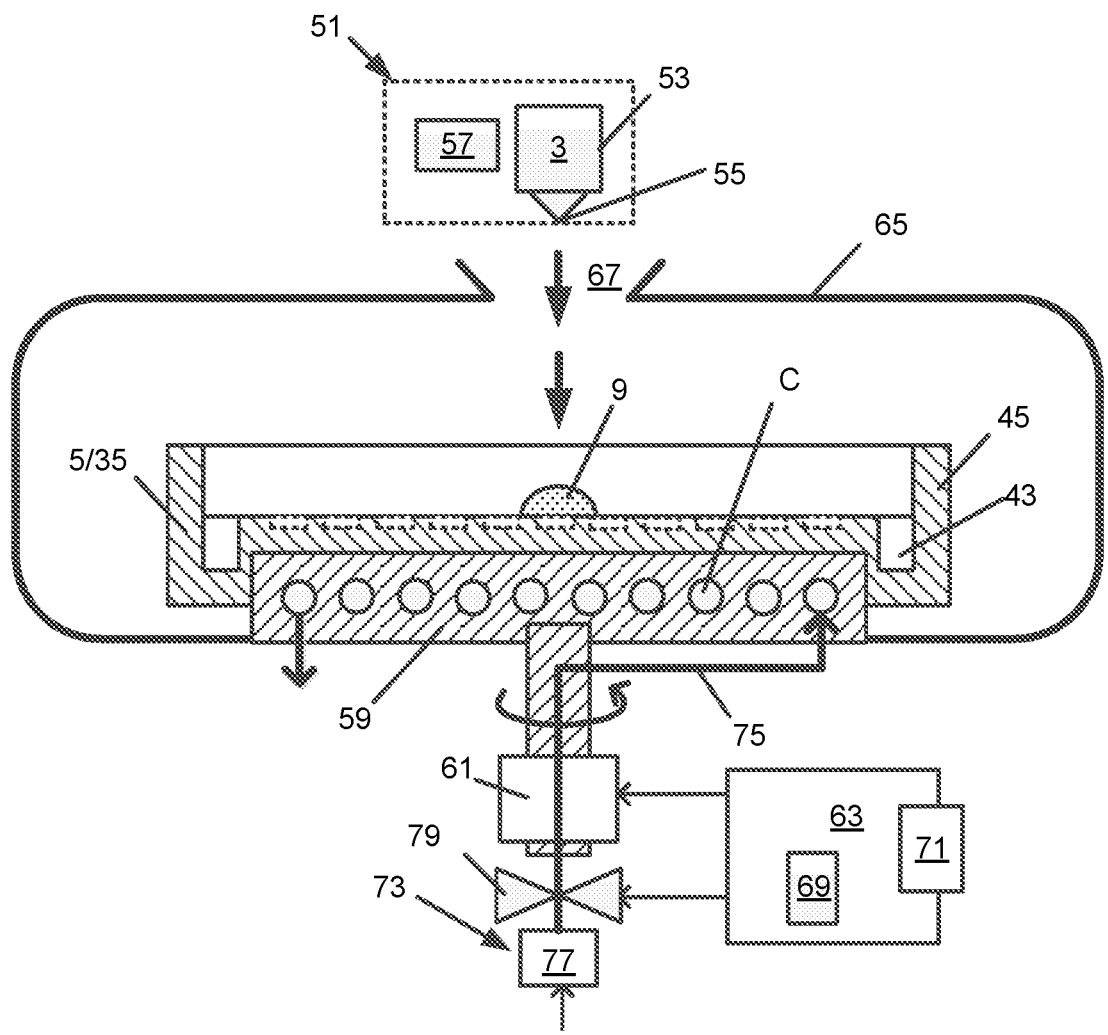
FIG. 7 shows a melt spinning apparatus.
Figure 8:
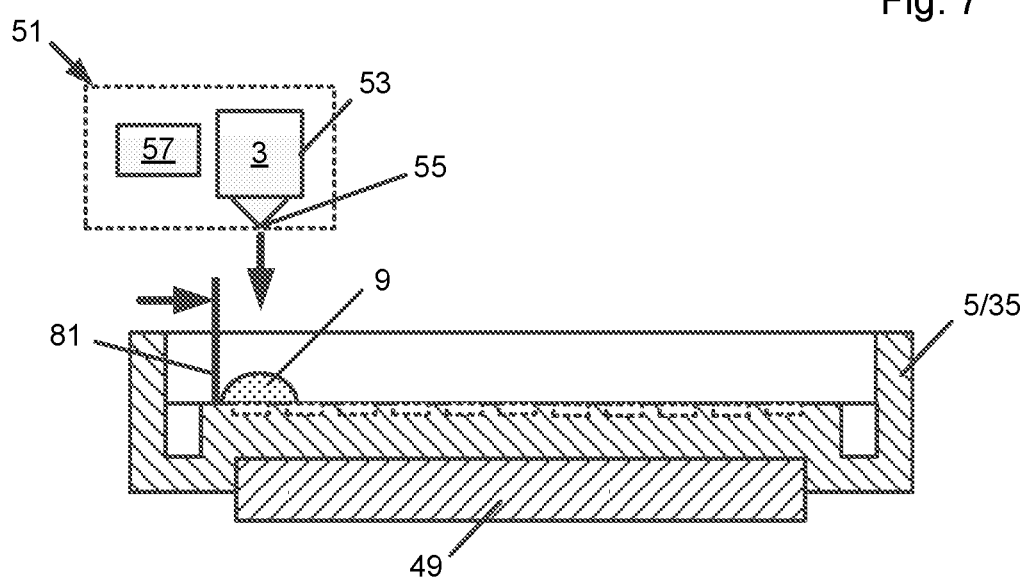
FIG. 8 shows a scraping apparatus.

As shown in FIG. 7, a very uniform distribution of very accurately determinable thickness of dispensed melt is, e.g., achieved by melt spinning. In this embodiment, the tray 5, 35 is mounted onto a rotating table 59, causing the tray 5, 35 to rotate around its longitudinal axis. This rotational movement causes the melt dispensed onto a center of the rotating tray 5 coinciding with the axis of rotation to uniformly spread in all directions perpendicular to the axis of rotation. When melt spinning is performed on the tray 5, wherein the coplanar surface segments 7 are comprised in the single flat surface 33, the rotational movement causes the melt to form a film of uniform thickness on this flat surface 33. When melt spinning is performed on the tray 35 having the recesses 39 shown in FIG. 5, the rotational movement causes the melt to spread into the recesses 39, thus filling each recess 39 with a film of uniform thickness. In consequence, the film covering the flat surface 33, as well as the films filling the recesses 39, are each transformed into the sheet 13, 41 of corresponding shape by cooling to a temperature below the melting point of the ion-selective material.

As shown in FIG. 7, melt spinning is, e.g., performed by a melt spinning apparatus comprising the rotating table 59, a motor 61 causing the rotating table 59 to rotate around its longitudinal axis of rotation, and a controller 63 connected to the motor 61 and embodied, e.g., programmed, to initiate and to control the melt spinning process by causing the motor 61 and thus also the tray 5, 35 mounted on the rotating table 59 to rotate at a predetermined speed or a predetermined sequence of speeds of rotation.

As an optional feature, the melt spinning apparatus may comprise a table cover 65 covering or enclosing the tray 5, 35 on the rotating table 59. The table cover 65 comprises an opening 67 located above the center of the tray 5, 35, enabling the melt to be dispensed onto the center of the tray 5, 35. The table cover 65 enhances the safety of operation because it protects people and the environment from accidentally coming into contact with hot melt.

During melt spinning, the thickness of the resulting film (s) and thus also of the sheet(s) 13, 41 may be controlled by controlling one or more parameters of a group of parameters comprising: the temperature of the dispensed melt, the speed of rotation of the rotating table 59, and a cooling rate at which the film(s) cool(s). The temperature of the melt is, e.g., adjusted by adjusting a temperature of the reservoir 53, e.g., a melt oven, containing the melt. The speed of rotation is controlled by the controller 63, controlling the speed of rotation of the motor 61 driving the rotating table 59. As an option, the speed of rotation is set and/or varied according to a previously determined schedule providing the speed of rotation to be employed as a function of time during performance of the melt spinning process. As an example, a sequence of different predefined speeds of rotation may be applied during consecutive time intervals during melt spinning. In such an embodiment, the controller 63 may be equipped with or connected to computing means 69, like e.g., a personal computer, a programmable logic controller, a microcontroller or another device, enabling the rotational speed or the time sequence of the rotational speeds to be programmed or provided, e.g., via a user interface 71 of the melt spinning apparatus connected to or comprised in the controller 63.

With respect to the transformation of the distributed melt into the ion-selective material, an active or passive cooling process may be performed. When passive cooling is applied, the film(s) forming on the tray 5, 35 is/are allowed to cool simply due to being exposed to an ambient temperature, e.g., a room temperature, below the melting point. When active cooling is applied, a cooling rate at which the film(s) forming on the tray 5, 35 is/are cooling is influenced or actively controlled, e.g., by means of a cooling apparatus 73 included on the melt spinning apparatus. To this extent, cooling means known in the art may be applied. FIG. 7 shows an example, wherein the cooling rate is influenced and/or controlled by cooling the rotating table 59, e.g., by circulating a cooling agent, like e.g., air, through at least one channel C extending through the rotating table 59 in parallel to the film(s) on the tray 5, 35, e.g., as indicated by the arrows shown in FIG. 7. To this extent, an air flow causing the air circulation is, e.g., provided by a pipe 75 connected to the channel C extending through the rotating table 59. The air flow through the pipe 75 is, e.g., controlled by the controller 63, controlling the air flow of air supplied by an air supply 77, like e.g., a pressurized air tank or a pump sucking in ambient air, e.g., by adjusting a valve setting of a valve 79 inserted in the pipe 75, accordingly. The pressurized tank or pump can be attached to the bottom of the rotating table 59.

Regardless of the type of tray 5, 35 employed, melt spinning provides the advantage that it enables very thin films, e.g., films having a thickness of 0.05 mm to 1 mm, in particular films having a thickness of less than 0.2 mm or even less than 0.1 mm, like e.g., a thickness of 0.05 mm to 0.1 mm, and thus also for correspondingly thin sheet(s) 13, 41 and membranes 1 to be manufactured very accurately, e.g., within a tolerance of +/−10 μm or less. Further, a high degree of uniformity of the thickness, e.g., a uniformity, wherein thickness variations are smaller or equal to 5% of the thickness of the membrane 1 throughout the entire disc area of the membranes 1, is achievable.

As an alternative option, distribution of the melt dispensed onto the tray 5, 35 can be performed by scraping the dispensed melt across the tray 5, 35 with a scraper 81. This step is, e.g., performed manually or by the scraping apparatus shown in FIG. 8 comprising the scraper 81 and a drive indicated by the arrow shown in FIG. 8 pushing the scraper 81 across the top side of the tray 5, 35. Even though scraping can be employed on the tray 5 comprising the single flat surface 37, a more uniform distribution and a much higher accuracy of the resulting thickness of the sheets 41 can be achieved when scraping is performed on a tray, like e.g., the tray 35 shown in FIG. 5, comprising at least one recess 39, each surrounded by the flat surface of the tray. In the latter embodiment, scraping has the additional advantage, that any excess base material not required to fill the recess(es) will be scraped off by the scraper 81 scraping across the flat surface 37 comprising the recess(es) 39. When the tray 35 shown in FIG. 5 is employed, the distribution results in a set of individual films being transformed into individual sheets 41, each filling one of the recesses 39. As an alternative option, a tray comprising only one or at least one recess, each recess having a depth corresponding to the predetermined thickness of the membranes 1 to be manufactured and a flat bottom surface comprising at least two or all the coplanar surface segments 7 can be employed. In such an embodiment, the distribution results in a number of coplanar films corresponding to the number of recesses, each being transformed into an individual sheet inside the respective recess.

When the spreadable base material 3 is provided in form of a powder, the powder is distributed into one or more coplanar powder layer(s). As an example, the powder is, e.g., distributed by scraping the powder across the tray 5, 35 with a scraper. This scraping operation can be, e.g., performed in the same way as described above with respect to the melt being scraped across the tray 5, 35, and the same types of trays 5, 35 can be employed. When a tray 35 comprising one or more recesses 39 is employed, this distribution results in a number of coplanar powder layers corresponding to the number of recesses 39, each filling one of the at least one recesses 39.

As a further option, improving the uniformity of the thickness of the powder layer(s), the powder may be provided as a very fine powder, consisting of powder particles having a diameter or particle size smaller or equal to 5 µm.

Regardless of whether the powder is distributed to form a single powder layer or a set of coplanar powder layers, the transformation of the distributed base material into the sheet(s) 13, 41 may be performed by heating the powder layer(s) to a temperature T above the melting point of the ion-selective material and subsequently cooling the melt produced by melting the powder layer(s) to a temperature below the melting point of the ion-selective material.

Figure 9:
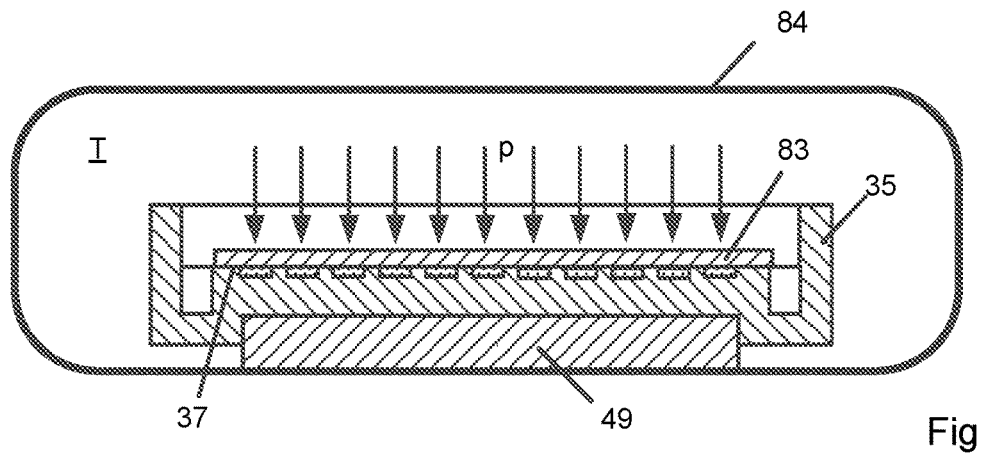
FIG. 9 shows an apparatus transforming powder layers into sheets.

As an option, the powder layer(s) are, e.g., pressed before and/or during heating. Compression of the powder layer(s) is, e.g., performed as shown in FIG. 9 by pressing a flat surface of a pressing plate 83 that is large enough to cover each powder layer against the flat surface 37 of the tray 35. As an example, a compression pressure p of between 0 bar and 5000 bar is applied as indicated by the arrows shown in FIG. 9.

In contrast to sintering methods known in the art, the powder layer(s) or the compressed powder layer(s) are heated to a temperature T above, in certain embodiments well above, the melting point of the ion-selective material. As an example, heating is performed in an oven 84 at a temperature T of 50° C. to 1000° C. above the melting point of the ion-selective material.

Following this, each melted powder layer is transformed into the sheet 13, 41 of corresponding shape by cooling. As described above with respect to the transformation of distributed base material 3 initially provided in form of a melt, a passive cooling process enabling the melted powder layers to cool to an ambient temperature, e.g., room temperature, or an active cooling process controlling the cooling rate can be employed.

By distributing the powder, heating and melting the powder layer(s), and cooling the melted powder layer(s), sheets 13, 41 having a very accurately predeterminable thickness can be manufactured. As an example, this method enables the thickness of the resulting sheet(s) 13, 41 and thus also the membranes 1 to be manufactured within a tolerance smaller or equal to +/−100 µm. Further, a high degree of uniformity of the thickness, e.g., a uniformity, wherein thickness variations are smaller or equal to 5% of the thickness throughout the entire area of the sheet can be achieved. Even though membranes 1 having a thickness of 0.05 mm to 1 mm or more can be manufactured this way, distributing the powder, heating and melting the powder layer(s), and cooling the melted powder layer(s) is better suited for manufacturing membranes 1 having a thickness larger or equal to 0.1 mm, e.g., a thickness of 0.1 mm to 1 mm or of 0.1 mm to 3 mm or larger.

Regardless of whether the base material 3 is supplied in form of a melt or a powder, the manufacturing tolerance of the thickness of the membranes 1 may be reduced even more by performing the distribution of the base material 3 such that the thickness of the distributed base material 3 deviates from the thickness of the membranes 1 to be manufactured by an offset accounting for a shrinkage to be expected due to the transformation of the distributed base material 11 into the sheet(s) 13, 41. In this respect, the depth of each recess 39 foreseen in the tray 35 is, e.g., dimensioned to be equal to a sum of the predetermined thickness of the membranes 1 to be manufactured and the offset corresponding to the thickness change occurring during the transformation. For example, the thickness change may be a thickness decrease, e.g., due to shrinkage of the distributed base material 11.

With respect to method step c) of removing the individual disc-shaped membranes 1 from the tray 5, 35, different methods can be applied.

In embodiments where the sheet(s) 13 produced by the transformation comprise at least one sheet 13 having a sheet area larger than the disc area of one of the membranes 1 comprised in the respective sheet 13, removal of the individual membranes 1 comprises, for each of these sheets 13, performing a step of separating the membranes 1 comprised in the respective sheet 13 from a remainder of the respective sheet 13, followed by a step of lifting these membranes 1 off the tray 5.

Separating the individual membranes 1 from the remainder of the sheet 13 is, e.g., performed by selectively removing the ion-selective material surrounding the individual membranes 1. As an option, this removing is, e.g., performed by a selective etching method, by laser cutting, by electrochemical discharge machining (ECDM) or by water-jet cutting. These methods do however involve thermal stress, high voltage and/or mechanical forces exerted onto the sheet 13, which may affect the quality of the membranes 1.

As an alternative option, separating the individual membranes 1 from the remainder of the sheet 13 is performed by electrochemically cutting out the individual membranes 1 comprised in the respective sheet 13.

Electrochemically cutting out the individual membranes 1 may be performed based on an electrochemical machining method that has been specially modified and adapted for this purpose. Electrochemical machining (ECM) is known in the art as a method of removing metal by an electrochemical process and is generally assumed to be limited to electrically conductive materials. Ion-selective material however has a very low electrical conductivity. Despite this low electrical conductivity, electrochemical machining (ECM) can be specially modified and adapted to cut sheets 13 of ion-selective material efficiently, as described in more detail below.

Figure 10:
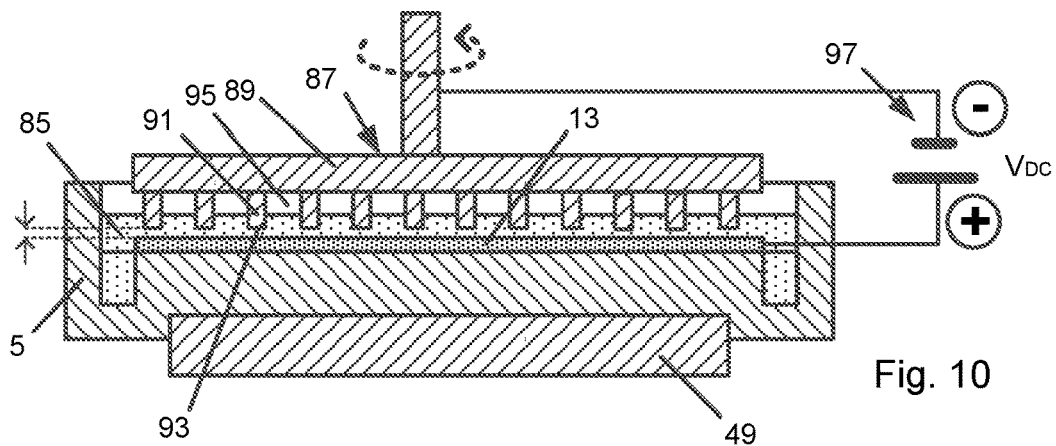
FIG. 10 shows an electrochemical cutting apparatus.

FIG. 10 shows an embodiment of the electrochemical cutting method specially adopted for electrochemically cutting individual membranes 1 out of sheets 13. In this embodiment, electrochemical cutting is performed by covering a top surface of the sheet(s) 13 with an electrolyte 85 and placing an electrode 87 above the sheet(s) 13 such that the electrode 87 extends into the electrolyte 85.

The electrolyte 85 can be any electrolyte capable of electrochemically etching the ion-selective material. Depending on the ion-selective material, electrolytes 85, like e.g., solutions of hydrogen fluoride, potassium hydroxide (KOH) or alkaline solutions can be applied. Solutions of hydrogen fluoride, like e.g., a hydrofluoric acid, are particularly well suited for electrochemically cutting ion-selective glasses. Since this cutting relies on an electrochemical process rather than on a purely chemical process, solutions of hydrogen fluoride can also be applied to cut sheet(s) 13 consisting of pH-glasses chemically (but not electrochemically) resistant to solutions of hydrogen fluoride.

Figure 11:
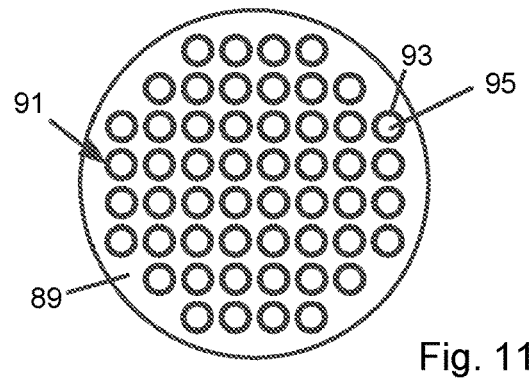
FIG. 11 shows a view of an end of the electrode shown in FIG. 10.

The electrode 87 consists essentially of a material, like e.g., stainless steel, tin or graphite, that is electrically conductive and chemically resistant to the electrolyte 85. In addition, the electrode 87 comprises a base element 89, e.g., a flat disc or a support, supporting a structure 91, like e.g., a honeycomb structure, protruding from a front side of the base element 89 facing the electrolyte 85. The structure 91 comprises a number of coplanar end surfaces 93, corresponding to the number of membranes 1 to be cut out. These end surfaces 93 are, e.g., each defined by an end surface of a structure element of the structure 91 and/or are part of a continuous front surface of the structure. Each end surface 93 surrounds a front of a recess 95 surrounded by the structure 91, having a cross-sectional area corresponding to the disc area of one of the membranes 1 to be cut out. FIG. 11 shows a view of a front side of the electrode 87 comprising the structure 91, wherein the structure 91 comprises a hollow cylinder having an inner diameter corresponding to the diameter of the membranes 1 to be manufactured for each of the membranes 1 to be cut out of the sheet 13. Regardless of the type of structure 91 employed, a surface area of the end surfaces 93 may be minimized, e.g., by minimizing a wall thickness of the hollow cylinders. This reduces the amount of ion-selective material removed during cutting.

As shown in FIG. 10, the electrode 87 is positioned such that the coplanar end surfaces 93 extend in parallel to the sheet 13 at a predetermined distance to the sheet 13. Next a DC voltage $V_{DC}$ is applied between the sheet 13 serving as anode and the electrode 87 serving as cathode. Due to the special shape of the electrode 87, in particular the protruding end surfaces 93 of the structure 91 and the electrolyte 85 covering the sheet 13, the applied DC voltage $V_{DC}$ causes an electrochemical cutting process selectively removing ion-selective material of the sheet 13 in the areas located opposite the end surfaces 93 surrounding the membranes 1 to be cut out.

The electrochemical cutting process is, e.g., performed in a semi- or fully automated manner by the electrochemical cutting apparatus shown in FIG. 10 comprising mounting means for mounting the tray 5, e.g., the support 49, the electrode 87 and a power supply 97 providing the DC voltage $V_{DC}$.

The special configuration of the electrode 87 provides the advantage that all individual membranes 1 comprised in the sheet(s) 13 are cut simultaneously. This reduces the manufacturing time required for separately forming the individual membranes 1.

As an option, a cutting time required to perform the cutting can be further reduced by adjusting a composition and/or increasing a temperature of the electrolyte 85, by increasing the DC voltage $V_{DC}$ applied, as well as by reducing the distance between the sheet(s) 13 and the end surfaces 93 of the electrode 87. In this respect, the cutting process may comprise at least one of the steps of: heating the electrolyte 85 to a temperature of 25° C. to 95° C., using an electrolyte 85 consisting essentially of a solution of hydrogen fluoride, having a concentration of 0.1% to 10% of hydrogen fluoride (HF), applying a DC voltage $V_{DC}$ of 0.1 V to 10 V, and positioning the end surfaces 93 of the electrode 87 at a distance of 1 μm to 10 mm, e.g., a distance of 0.001 mm to 3 mm, from the surface of the sheet(s) 13 facing towards the electrode 87 during cutting. A shorter distance will accelerate the cutting process but will also make performance and/or control of the process more difficult.

As an option, the cutting process may be further improved by recirculating the electrolyte 85 covering the sheet(s) 13. Recirculating the electrolyte 85 has the advantage that ion-selective material removed by electrochemical cutting will be transported away from the sheet(s) 13 more efficiently.

Once the membranes 1 have been individualized as shown in step c) in FIG. 1c, e.g., by performing the cutting process described above, they are lifted off the tray 5 as indicated by the arrows shown in FIG. 1c. As an example, the individual membranes 1 are lifted off manually, e.g., by using a suction cup, or in a semi- or fully automated manner, e.g., by a pick-and-place machine lifting them off the tray 5.

In the embodiment shown in FIGS. 5a-5c, the sheets 41 are separate elements, each constituting a separate membrane 1, that only needs to be lifted off tray 35, e.g., as described above with respect to the embodiment shown in FIG. 5c. This has the advantage, that the step of separating the individual membranes 1 is not required and thus omitted in this embodiment.

As an option, uniformity and consistency of the thickness of the membranes 1 can be further improved by performing a step of planarizing a surface of each sheet 13, 41 produced by the transformation of the distributed base material 11. Planarization can, e.g., be performed by polishing or etching. Even better results may be achieved by employing an electrochemical planarization method.

Figure 12:
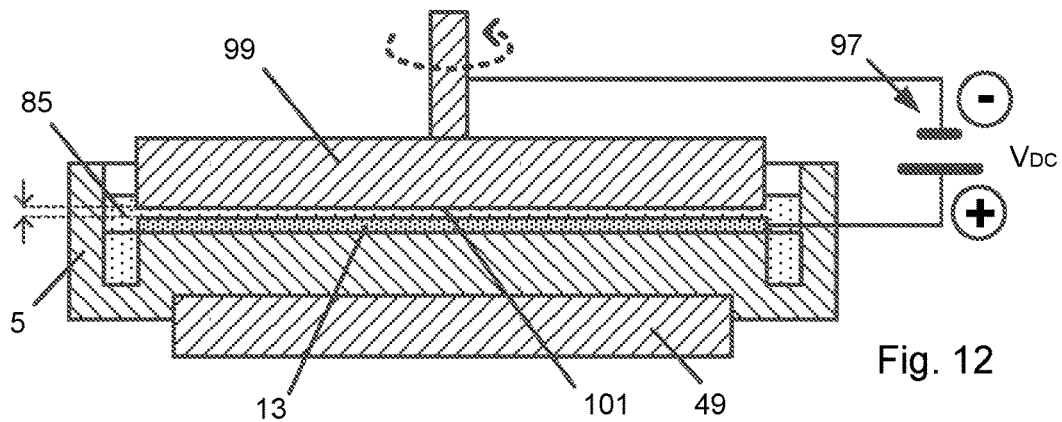
FIG. 12 shows an electrochemical planarization apparatus.

Electrochemical planarization of electroplated Cu/Si wafers is described on page 124 ff, in section 4, titled: "Mechanisms of electrochemical planarization" by J. Huo, R. Solanke and J. McAndrew of "Focus on Electrochemistry Research" published by Nova Science Pub. Inc. in January 2006, FIG. 12 shows an example of an electrochemical planarization method of planarizing a surface of each sheet 13, 41 produced by the transformation of the distributed base material 11. Even though FIG. 12 shows this method performed on the single sheet 13 produced on the tray 5 shown in FIG. 1, the method can be employed in a similar way to simultaneously planarize the coplanar surfaces of two or more sheets, like e.g., the sheets 41 shown in FIG. 5, produced on one of the trays 35 comprising at least one recess described above.

As shown in FIG. 12, electrochemical planarization is performed by covering the sheet(s) 13, 41 with an electrolyte 85 and placing an electrode 99 above the electrolyte 85 such that a front surface of the electrode 99 facing the sheet(s) 13, 41 is immersed in the electrolyte 85. As described above with respect to the electrochemical cutting, depending on the ion-selective material employed, electrolytes 85, like e.g., solutions of hydrogen fluoride, potassium hydroxide (KOH) or alkaline solutions, capable of electrochemically etching the ion-selective material can be employed, and the electrode 99 consists essentially of a material, like e.g., stainless steel, tin or graphite, that is electrically conductive and chemically resistant to the electrolyte 85.

In the example shown, the electrode 99 comprises a flat surface 101 facing towards the electrolyte 85 and is positioned such that the flat surface 101 extends in parallel to the sheet(s) 13, 41.

Next a DC voltage $V_{DC}$, e.g. a DC voltage $V_{DC}$ of 0.1 V to 10 V, is applied between each sheet 13, 41 serving as anode and the electrode 99 serving as cathode, which causes an electrochemical planarization of the surface(s) of the sheet(s) 13, 41 facing towards the electrode 99.

As an option, the electrode 99 may be configured as a rotatable electrode rotating around its longitudinal axis perpendicular to the flat surface 101 as indicated by the dotted arrow shown in FIG. 12 during planarization. Even though rotating the electrode 99 is possible and may further improve the planarization result, it is not mandatory when the electrode 99 comprising the flat surface 101 facing the sheet(s) 13, 41 is used. Instead, the flat surface 101 also enables the electrode 99 to be kept stationary during planarization.

As an alternative option, a rotatable electrode having a different shape may be used instead. Examples are electrodes comprising a rotatable bar, a rotatable plate or a rotatable mesh rotating during planarization.

Due to the similarities between the electrochemical cutting described above and the electrochemical planarization method, the apparatus shown in FIG. 10 can be employed to perform the planarization. In such an embodiment, the electrode 87 shown in FIG. 10 is configured as a rotatable electrode, rotating around its longitudinal axis as indicated by the dotted arrow in FIG. 10 during planarization. As an alternative option, the electrode 87 is either replaced by the stationary or rotatable electrode 99 shown in FIG. 12 or by one of the rotatable electrodes described above.

Regardless of its shape, the electrode 87, 99 is positioned at a predetermined distance, e.g., a distance of 1 μm to 10 mm, e.g., of 0.001 mm to 3 mm, from the surface(s) of the sheet(s) 13, 41 during planarization. A shorter distance will improve the planarization result but will also make performance and/or control of the process more difficult.

As an option, the planarization process may be further improved by recirculating the electrolyte 85 covering the sheet(s) 13, 41. Recirculating the electrolyte 85 has the advantage that ion-selective material removed by electrochemical planarization will be transported away from the sheet(s) 13, 41 more efficiently. This helps to keep the planarization process more stable and hence increases the precision of uniformity of the planarized sheet(s) 13, 41.

The optional step of planarization further improves the uniformity of the thickness of membranes 1. As an example, a uniformity of the of thickness of 3% or better can be achieved.

The invention claimed is:

1. A method of manufacturing membranes of an ion-selective material, the method comprising:

providing a spreadable base material in a form of a melt, wherein the base material comprises all constituents of the ion-selective material and can be transformed into the ion-selective material;

dispensing a quantity of the base material onto a top side of a tray, wherein the top side comprises a set of flat coplanar surface segments, each having a surface area corresponding to a disc area of one membrane to be manufactured on the tray, and wherein the tray or at least the top side of the tray is a material enabling the base material to be distributed across the top side of the tray and enabling the ion-selective material to be removed from the tray;

distributing the dispensed base material across the top side of the tray by melt spinning such that a thickness of the distributed base material covering the coplanar surface segments corresponds to a predetermined thickness, wherein the distributed base material comprises one or more coplanar films;

transforming the distributed base material into the ion-selective material comprising one or more coplanar sheets covering at least the coplanar surface segments by cooling the distributed material to a temperature below a melting point of the ion-selective material; and removing individual membranes from the tray, each membrane defined by a disc-shaped section of the ion-selective material attained by the transforming of the distributed base material.

2. The method of claim 1, wherein melt spinning is performed by:

mounting the tray onto a rotating table and causing the tray to rotate;

dispensing the quantity of the melt onto a center section of the rotating tray; and controlling a thickness of each sheet resulting from transforming the distributed base material by controlling one or more parameters including a temperature of the melt, a speed of rotation or a time sequence of speeds of rotation of the rotating table, a cooling rate at which the melt cool, and/or an air flow circulating through at least one channel extending in parallel to the one or more coplanar films through the rotating table.

3. The method of claim 1, wherein:

each coplanar surface segment is defined by a segment of a single flat surface comprising the coplanar surface segments; and the base material is distributed across the single flat surface and transformed into a single sheet of ion-selective material.

4. The method of claim 1, wherein:

the tray comprises a flat surface surrounding at least one recess, wherein:

each recess has a flat bottom surface area defining one of the coplanar surface segments or comprising at least one, several or all of the coplanar surface segments;

each recess has a depth corresponding to the predetermined thickness or a depth given by a sum of the predetermined thickness and an offset corresponding to a thickness change caused by transforming the distributed base material into the ion-selective material;

by distributing the base material across the tray, each recess is filled with the base material; and the distributed base material filling each recess is transformed into individual disc-shaped sheets of ion-selective material.

5. The method of claim 1, wherein removing the membranes from the tray comprises the steps of:
separating individual membranes from a remainder of the one or more coplanar sheets or separating each membrane of the one or more coplanar sheets from the remainder of the one or more coplanar sheets by selective etching, by electrochemical discharge machining, by laser cutting, by waterjet cutting or by electrochemically cutting out the membranes; and
lifting the membranes off the tray.

6. The method of claim 1, wherein removing the membranes from the tray comprises the step of electrochemically cutting out individual membranes from the one or more coplanar sheets by:
covering a top surface of the one or more coplanar sheets with an electrolyte capable of electrochemically etching the ion-selective material;
placing an electrode above the one or more coplanar sheets such that the electrode extends into the electrolyte, wherein the electrode comprises a structure or a structure defining a honeycomb structure, the structure protruding from a front side of the electrode facing the tray, the structure comprising a number of coplanar end surfaces corresponding to the number of membranes to be cut out, each end surface surrounding an end section of an electrode recess surrounded by the structure having a cross-sectional area corresponding to a disc area of the membrane to be cut out by the end surface;
positioning the coplanar end surfaces in parallel to the one or more coplanar sheets at a predetermined distance or a distance of 1 µm to 10 mm or a distance of 1 µm to 3 mm to the one or more coplanar sheets; and
cutting out the membranes by applying a DC-voltage or a DC voltage of 0.1 V to 10 V between each sheet serving as anode and the electrode serving as cathode.

7. The method of claim 6, further comprising one or more of the steps of:
covering the top surface of the one or more coplanar sheets with a solution of hydrogen fluoride, with hydrofluoric acid, with a solution of hydrogen fluoride having a concentration of 0.1% to 5% of hydrogen fluoride, with potassium hydroxide, with an alkaline solution, or with another electrolyte capable of electrochemically etching the ion-selective material;
heating the electrolyte to a temperature of 25° C. to 95° C.;
positioning the electrode such that the coplanar end surfaces of the electrode are located at a distance of 1 µm to 10 mm or a distance of 0.001 mm to 3 mm from the top surface of the one or more coplanar sheets facing towards the electrode during the cutting; and
recirculating the electrolyte covering the one or more coplanar sheets during electrochemical cutting.

8. The method of claim 1, further comprising one or more of the steps of:
performing the distribution of the base material such that the thickness of the distributed base material deviates from the predetermined thickness of the membranes to be manufactured by an offset accounting for a thickness change caused by transforming the distributed base material into the ion-selective material;
performing at least one of the method steps in a semi- or fully automated manner, by using an apparatus configured to perform the respective step to perform the respective step; and
performing a step of planarizing a surface of each of the one or more coplanar sheets or of planarizing a surface of each of the one or more coplanar sheets by polishing, by etching or by electrochemical planarization.

9. The method of claim 1, further comprising a method step of planarizing a surface of each of the one or more coplanar sheets by:
covering a top surface of the one or more coplanar sheets with an electrolyte or an electrolyte given by a solution of hydrogen fluoride, a hydrofluoric acid, a solution of hydrogen fluoride having a concentration of 0.1% to 5% of hydrogen fluoride, potassium hydroxide or by an alkaline solution, wherein the electrolyte is capable of electrochemically etching the ion-selective material;
positioning an electrode at a predetermined distance, a distance of 1 µm to 10 mm or a distance of 0.001 mm to 3 mm, above the top surfaces of the one or more coplanar sheets such that the electrode extends into the electrolyte; and
planarizing the surface of each of the one or more coplanar sheets by applying a DC-voltage or a DC-voltage of 0.1 V to 10 V between the one or more coplanar sheets serving as anode and the electrode serving as cathode.

10. The method of claim 9, wherein the electrode is either:
an electrode comprising a flat surface, wherein the flat surface is facing towards and extends parallel to the one or more coplanar sheets, and wherein the electrode is either stationary or rotating around its longitudinal axis substantially perpendicular to its flat surface during planarization; or
a rotatable electrode rotating during planarization; or
an electrode comprising a rotatable bar, a rotatable plate, or a rotatable mesh rotating during planarization; or
a rotatable electrode rotating around its longitudinal axis during planarization and comprising a structure or a structure defining a honeycomb structure, the structure protruding from a front side of the electrode facing the tray.

11. The method of claim 1, wherein the tray comprises at least one of:
an annular groove surrounding a flat surface of the tray;
an outside side wall surrounding the flat surface and extending above the flat surface of the tray;
a recess located on its back side facing away from the topside configured to enable mounting the tray onto a support; and
fasteners configured to mount the tray onto the support.

12. The method of claim 1, wherein the ion-selective material is:
an ion-selective glass, a pH-glass, a pH-glass suitable for high temperature applications, a pH-glass chemically resistant to solutions of hydrogen fluoride, an ion-selective crystalline solid, fluoride ion-selective lanthanum trifluoride ($LaF_3$), an ion-selective polymer, or a sulfonated tetrafluoroethylene based fluoropolymer-copolymer.

13. A membrane manufactured by the method of claim 1, having at least one of:
a thickness of 0.05 mm to 3 mm or of 0.05 mm to 1 mm;
a thickness of less than 0.3 mm, of less than 0.2 mm or of less than 0.1 mm;
a uniformity of the thickness, wherein thickness variations are smaller or equal to 5% or smaller or equal to 3% of the thickness of the membrane throughout an entire disc area of the membrane; and
a disc area of 1 $mm^2$ to 100 $mm^2$.

14. A sensor for measuring a variable of a medium, the sensor comprising a membrane manufactured by the method of claim 1, wherein the variable is an activity or a concentration of an analyte comprised in the medium or a pH-value of the medium, the sensor further comprising:

a housing;

an electrolyte contained within the housing; and an electrode extending into the electrolyte, wherein the membrane is attached to the housing such that an outer surface of the membrane is exposable to the medium and an inner surface of the membrane is in contact with the electrolyte.

15. A method of manufacturing membranes of an ion-selective material, the method comprising:

providing a spreadable base material in a form of a powder, wherein the base material comprises all constituents of the ion-selective material and can be transformed into the ion-selective material;

dispensing a quantity of the base material onto a top side of a tray, wherein the top side comprises a set of flat coplanar surface segments, each having a surface area corresponding to a disc area of one membrane to be manufactured on the tray, and wherein the tray or at least the top side of the tray is a material enabling the base material to be distributed across the top side of the tray and enabling the ion-selective material to be removed from the tray;

distributing the dispensed base material across the top side of the tray by scraping the base material across the top side such that a thickness of the distributed base material covering the coplanar surface segments corresponds to a predetermined thickness, wherein the distributed base material comprises one or more coplanar powder layers;

transforming the distributed base material into the ion-selective material comprising one or more coplanar sheets covering at least the coplanar surface segments; and removing individual membranes from the tray, each membrane defined by a disc-shaped section of the ion-selective material attained by the transforming of the distributed base material.

16. The method of claim 15, wherein:

the base material consists essentially of particles having a diameter or particle size smaller or equal to 5 μm;

the one or more coplanar powder layers are transformed into the one or more coplanar sheets by:

melting the one or more coplanar powder layers by heating the one or more coplanar powder layers to a temperature above a melting point of the ion-selective material or to a temperature of 50° C. to 1000° C. above the melting point of the ion-selective material, thereby producing a melt of the one or more coplanar powder layers, and subsequently cooling the melt to a temperature below the melting point; or pressing the one or more coplanar powder layers and heating the one or more coplanar powder layers to a temperature above the melting point of the ion-selective material or to a temperature of 50° C. to 1000° C. above the melting point of the ion-selective material and subsequently cooling the thus-produced melt to a temperature below the melting point, wherein the pressing is performed by applying a compression pressure of 0 bar to 5000 bar to the one or more coplanar powder layers before the one or more coplanar powder layers are heated, before and during heating of the one or more coplanar powder layers, or during heating of the one or more coplanar powder layers.

* * * * *